(12) United States Patent  
Spears

(10) Patent No.: US 8,530,815 B2  
(45) Date of Patent: Sep. 10, 2013

(54) IMAGING DEVICE WITH VARYING OPTICAL SIGNAL AT A LOCATION OF A MULTI-DIMENSIONAL ARRAY OF LIGHT SENSITIVE ELEMENTS

(75) Inventor: Kurt Eugene Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 13/149,646

(22) Filed: May 31, 2011

(65) Prior Publication Data

US 2012/0307221 A1 Dec. 6, 2012

(51) Int. Cl.  
*H01L 27/00* (2006.01)
(52) U.S. Cl.  
USPC ........................................ 250/208.1; 250/205
(58) Field of Classification Search  
USPC .......... 250/208.1, 205, 214 R; 358/492–513; 348/294–324; 235/462.41, 462.23, 462.45, 235/462.07, 462.11; 382/317, 312; 355/67, 355/77

See application file for complete search history.

(56) References Cited

U.S. PATENT DOCUMENTS

| 4,852,972 | A | 8/1989 | Lo |
| 6,864,916 | B1 | 3/2005 | Nayar et al. |
| 7,333,250 | B2 | 2/2008 | Spears et al. |
| 7,503,498 | B2 | 3/2009 | Zhu et al. |
| 7,611,064 | B2 | 11/2009 | Zhu et al. |
| 8,405,750 | B2 * | 3/2013 | Smith et al. ................... 348/308 |
| 2011/0058082 | A1 | 3/2011 | Tay |

FOREIGN PATENT DOCUMENTS

KR 20050063857 6/2005

\* cited by examiner

*Primary Examiner* — Que T Le

(57) ABSTRACT

Example embodiments disclosed herein relate to an imaging device. The imaging device includes a multi-dimensional array of light sensitive elements, an illumination source that outputs an optical signal, an optical element that focuses the optical signal on the array, and an illumination controller. The illumination controller varies the output of the optical signal to control exposure at a location of the array.

20 Claims, 10 Drawing Sheets

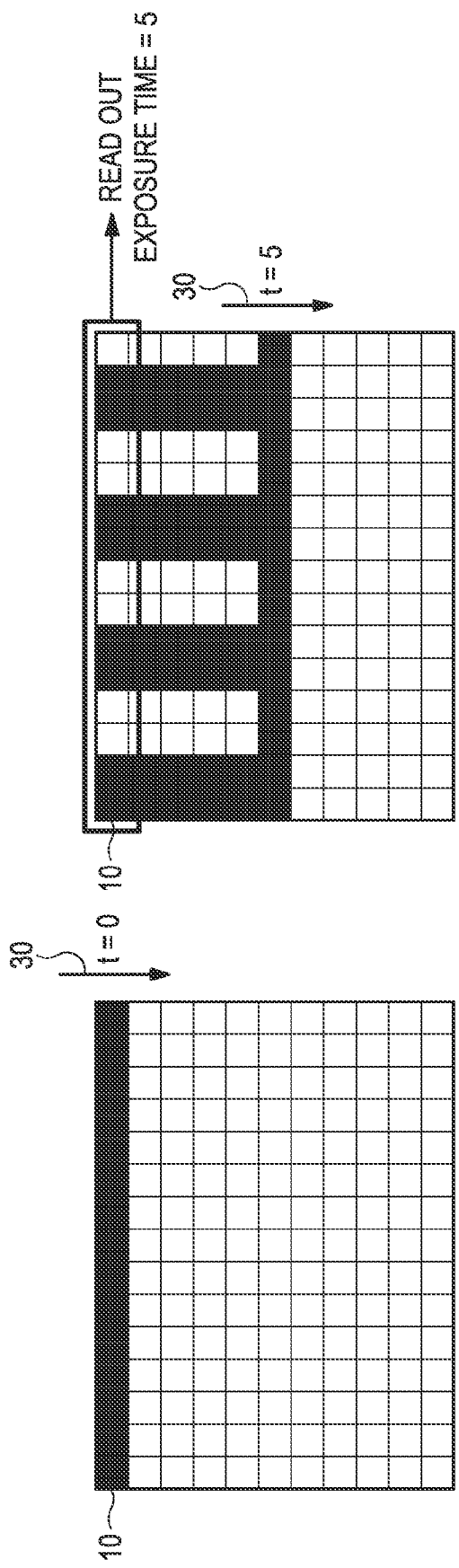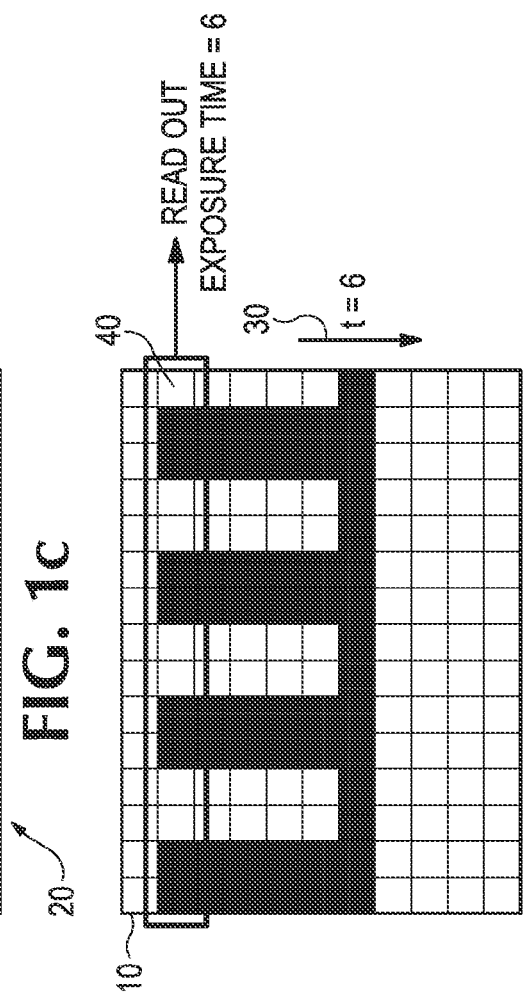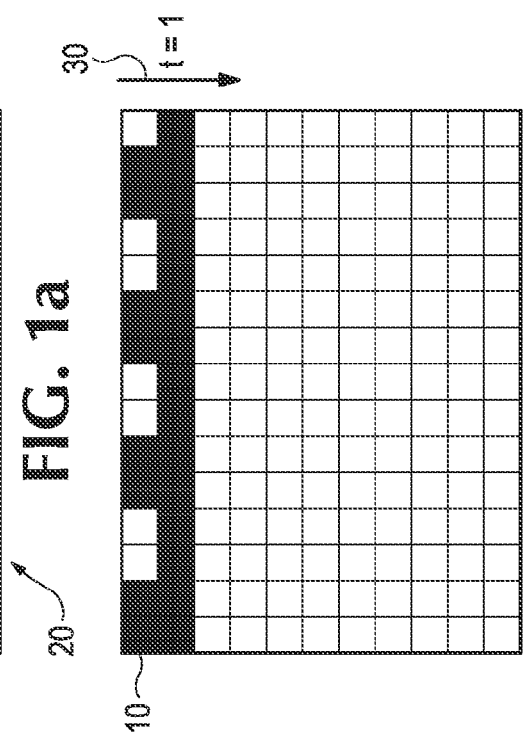

IMAGING DEVICE WITH VARYING OPTICAL SIGNAL AT A LOCATION OF A MULTI-DIMENSIONAL ARRAY OF LIGHT SENSITIVE ELEMENTS

BACKGROUND

A challenge exists to deliver quality and value to consumers, for example, by providing various capabilities in imaging and printing devices while maintaining cost effectiveness and output speed. Further, imaging and printing businesses may desire to enhance the functionality of their devices. For example, such businesses may desire to provide enhanced image reproduction capability without requiring additional effort on the part of such consumers.

BRIEF DESCRIPTION OF THE DRAWINGS

The following detailed description references the drawings, wherein:

FIGS. 1a-1d illustrate a rolling reset and rolling readout of a two-dimensional sensor array, as used in one example.

DETAILED DESCRIPTION

Imaging devices ideally capture images and reproduce them as accurately as possible. These captured images can include things such as photographs and scanned documents. However, realistic reproduction can be difficult because of challenges and limitations associated with a particular design.

For example, in some optical imaging systems, light from an image is focused by optics onto a two-dimensional sensor array. The two-dimensional sensor array is divided into rows of light sensitive pixels. A rolling reset first proceeds through the two-dimensional sensor array and successively resets each row. After an appropriate exposure time has elapsed, a rolling readout operation proceeds through the sensor array to capture the exposure value for the pixels in that array. An image is then constructed from these exposure values.

For example, as shown in FIG. 1a, a rolling reset starts at row one 10 of two-dimensional sensor 20, at time zero (t=0), and then proceeds down one row per time period in the direction of arrow 30, as shown in FIG. 1b. The time period is set to be the amount of time the system requires to read one row. In this example, the exposure time is set to five such that row one 10 is read out by the system after five time periods, as shown in FIG. 1c. Subsequently, row two 40 is read out at time six (t=6), as shown in FIG. 1d. In a typical system, all rows in the sensor array have an identical exposure duration using a combination of the rolling shutter and the subsequent rolling readout.

Figure 2:
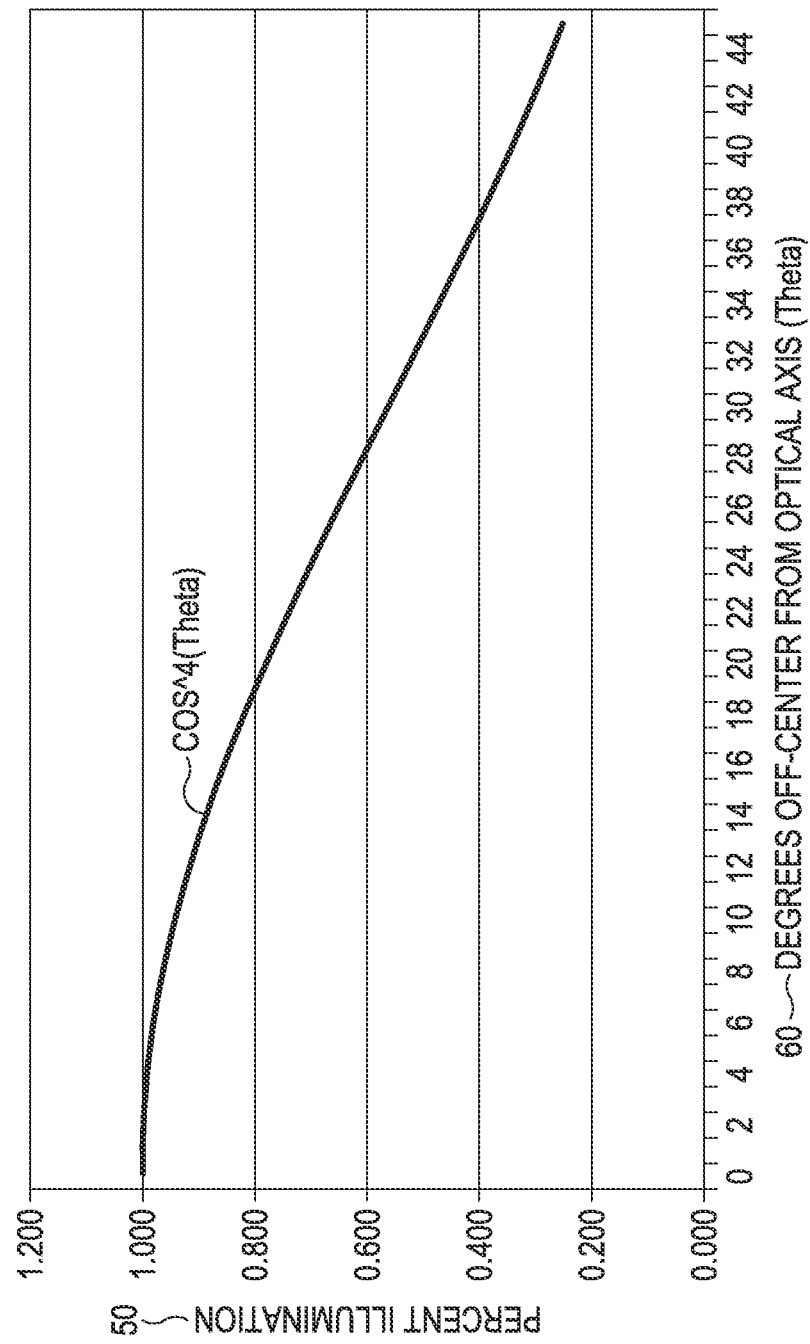
FIG. 2 is a graph illustrating a decrease of a percent of illumination intensity as a function of the cosine of the angle off-center from an optical axis, raised to the fourth power, as used in one example.

In such optical imaging systems, the collected light is lower for portions of an image off-center from the optical axis. The illumination intensity decreases as a function of the cosine of the angle off-center from the optical axis, raised to the fourth power. FIG. 2 illustrates this effect graphically where the percent illumination 50 is graphed as a function of the angle theta in degrees off-center from the optical axis 60.

This "cosine-four impact" causes the collected light and corresponding signal-to-noise ratio to be significantly lower for the outer portions of the image because illumination is controlled to prevent the central portion of an image from being saturated. This results in low image quality at the outer edges of the image. For systems using a two-dimensional imaging sensor, the signal-to-noise at the corners of the image can be more than three-times lower than the signal-to-noise in the center of the image.

In addition, non-uniformity of the illumination source can further reduce the signal-to-noise at the corners of the image. This occurs because in many illumination sources the output signal or intensity is typically brighter towards the center of an illuminated area and is reduced in intensity towards the edges of the illuminated area.

Figure 3:
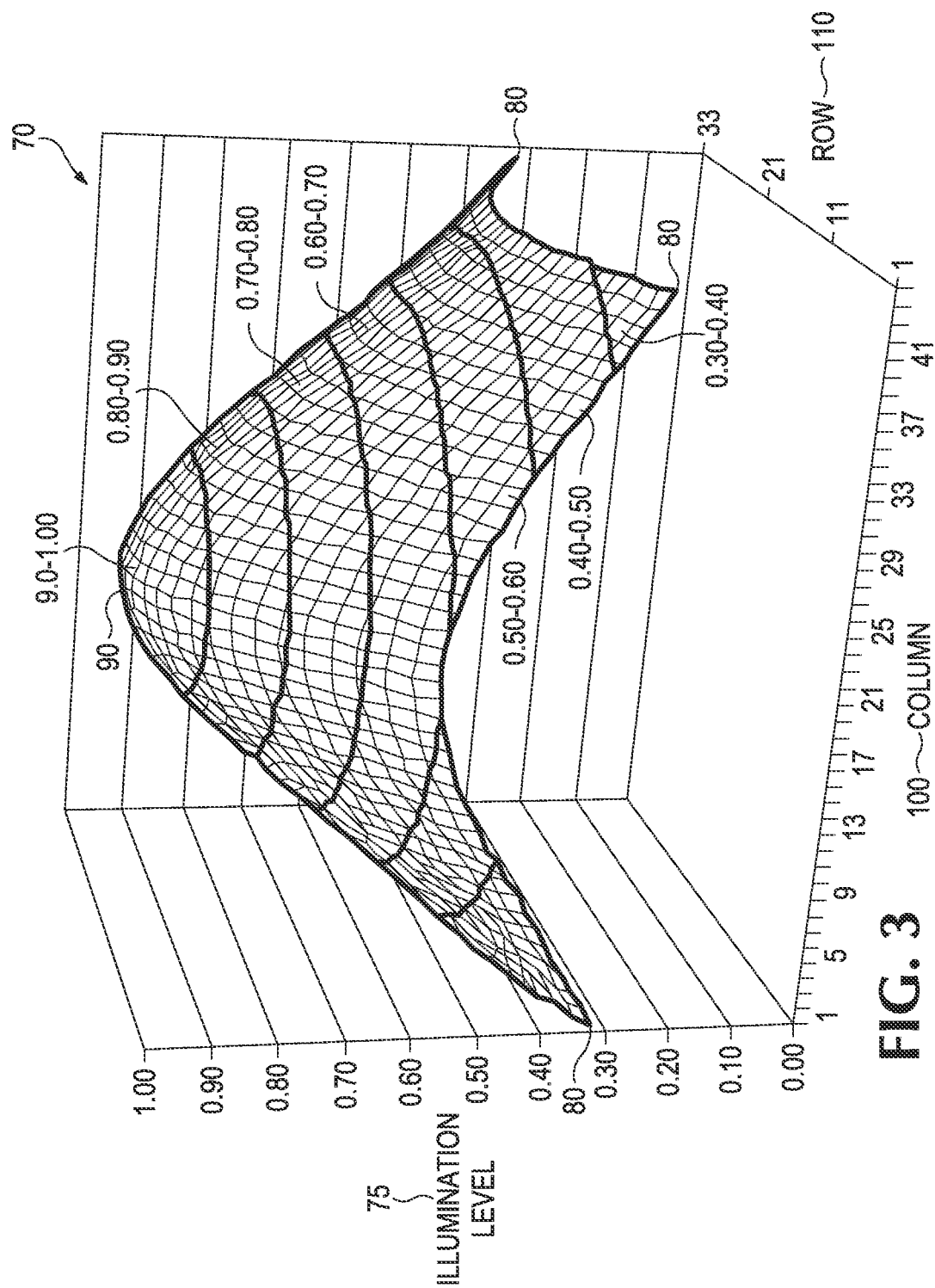
FIG. 3 shows the uncorrected illumination profile for a rectangular document captured by an 82 degree total field-of-view lens, prior to correction in one example.

FIG. 3 shows the uncorrected illumination profile 70 for a rectangular document captured by an 82 degree total field-of-view lens. For a uniform target, the illumination intensity or level 75 at the corners 80 of the image is approximately 32% of the illumination intensity at the center 90 of the optical field. FIG. 3 illustrates the results for an image sensor using a 44×33 grid (44 columns 100 and 33 rows 110) which corresponds to a 4:3 aspect ratio used in some image sensors.

A solution to this "cosine-four impact" is to apply analog or digital gain to the outer portions of the image to increase the signal and normalize the image. However, such a gain technique increases both the signal and the noise such that the signal-to-noise ratio of the outer portions is typically very poor. Alternatively, a system can capture multiple images with different illumination levels and construct a composite image. However, this method is computationally intensive and it is difficult to achieve proper uniformity and linearity in the image. It can also add cost due to the additional needed computing capability and can lower the speed at which images can be produced.

Figure 4:
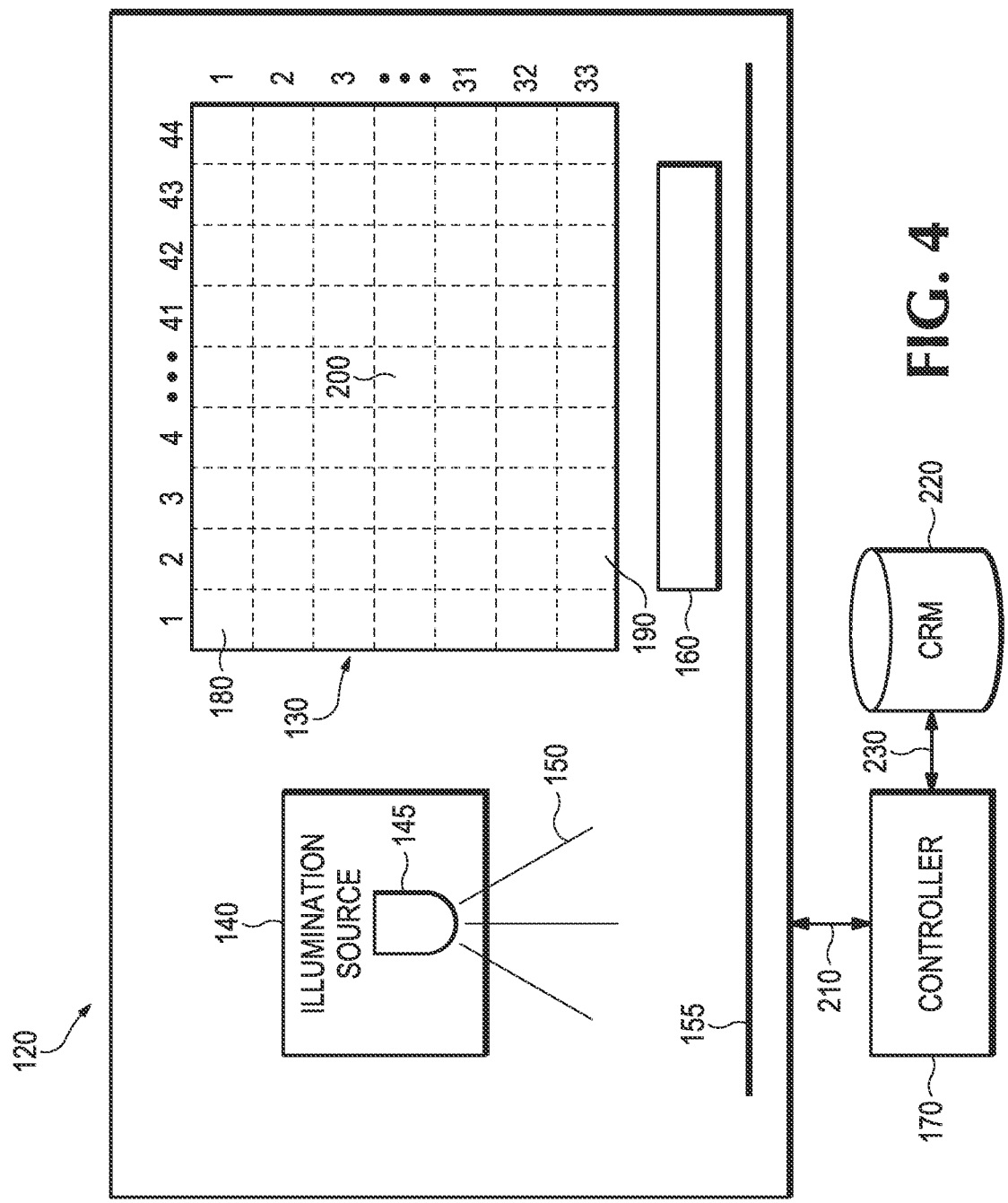
FIG. 4 is a block diagram and example of an imaging device.

To optimize the signal-to-noise in the image, the illumination of the captured image should be as uniform as possible over the image field of the sensor. An example of an imaging device 120 designed with this goal in mind is shown in the block diagram of FIG. 4. Imaging device 120 includes a multi-dimensional array of light sensitive elements 130, an illumination source 140 that outputs an optical signal 150, an optical element 160, and an illumination controller 170. As shown in FIG. 4, illumination source 140 may include one or more light-emitting diodes (LEDs) 145. Multi-dimensional array 130 includes a plurality of rows 180 and columns 190 of light sensitive elements that are arranged so as to be positioned relative to a central location 200. In this particular example, array 130 includes thirty-three (33) rows 180 and forty-four (44) columns 190.

Illumination source 140 generates an optical signal 150 that illuminates object 155. Optical element 160 is designed to image object 155 which is illuminated by optical signal 150 on multi-dimensional array of light sensitive elements 130. Optical element 160 can be a variety of designs and include one or more lenses, mirrors, or a combination of the two. Illumination controller 170 is designed to vary an output of optical signal 150 of illumination source 140 to control exposure at one or more locations of array 130, as generally indicated by double arrow 210. For example, illumination controller 170 may vary the output of optical signal 150 based on distance from central location 200. As another example, illumination controller 170 may vary the output of optical signal 150 based upon a location of a row 180 within array 130 or based upon a location of a column 190 within array 130.

Imaging device 120 utilizes a rolling shutter that consists of two synchronized events, a rolling reset and a rolling readout, as described earlier in FIGS. 1a-1d, both of which occur on multi-dimensional array 130 of light sensitive elements. First the rolling reset proceeds through array 130 and successively resets each of the rows 180 to an initial value. After the appropriate exposure time has elapsed, the rolling readout operation proceeds through each of the rows 180 of array 130. Illumination controller 170 synchronizes optical signal 150 of illumination source 140 with the rolling shutter such that the output of optical signal 150 is increased while exposing rows 180 or columns 190 further away from central location 200 and decreased during exposure of central location 200. This technique allows the illumination level to be increased for the outer portions of the image and reduces the "cosine-four impact", discussed above.

Illumination controller 170 can be of a variety of designs and include a processor that executes instructions stored on a non-transitory computer-readable medium (CRM) 220, as generally indicated by double arrow 230. Computer-readable medium 220 can include any type of memory device or combination thereof, such as a hard drive, read only memory (ROM), random access memory (RAM), flash drive, etc.

Figure 5:
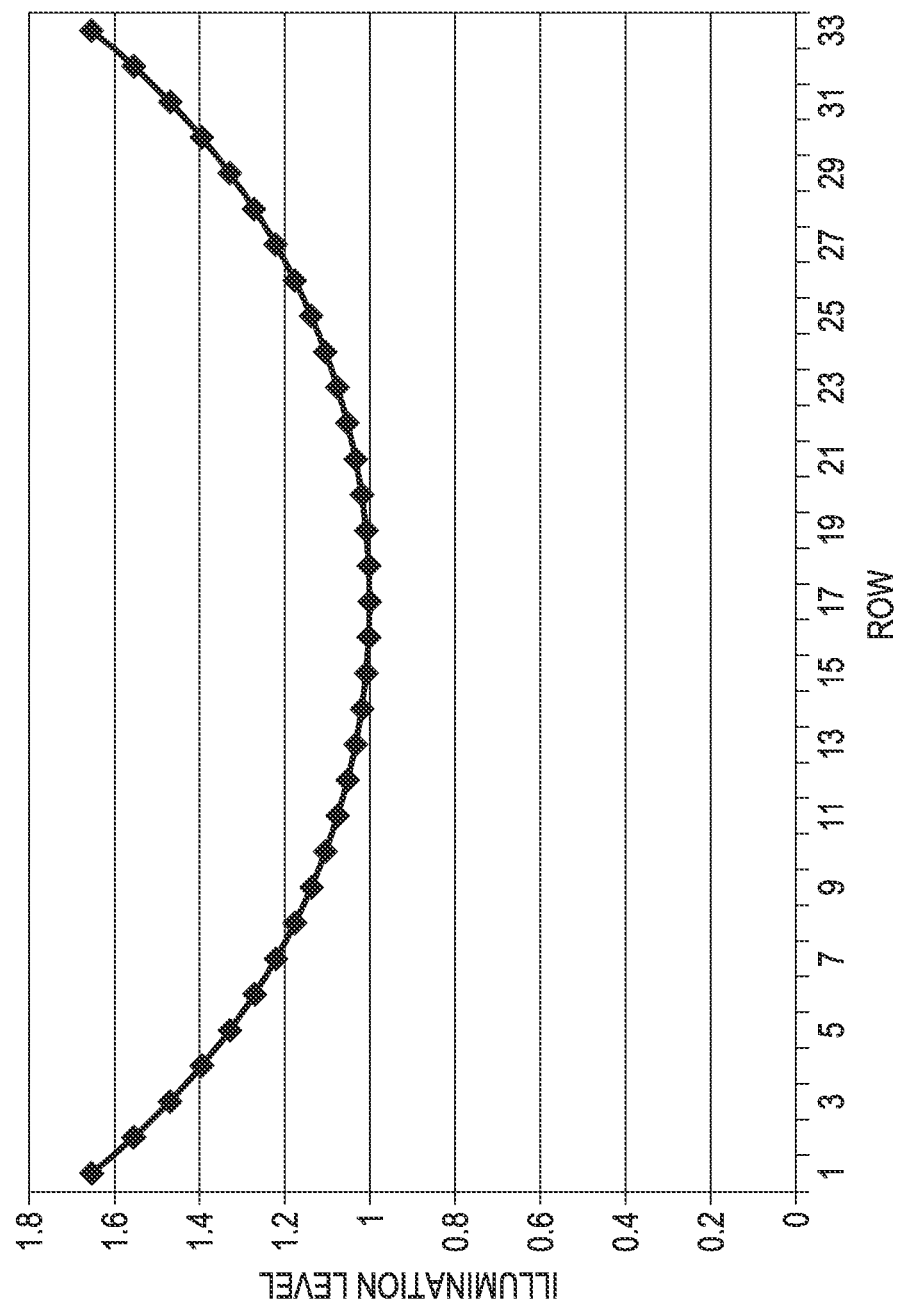
FIG. 5 is an example of an illumination level profile.

For example, because multi-dimensional array of light sensitive elements is divided into thirty-three (33) rows 180, the illumination level of optical signal 150 of illumination source 140 for the first row can be set to 1.65 times the illumination level for the row at central location 200. The illumination level of optical signal 150 of illumination source 140 for the second row is then set to 1.56 times the illumination level for the row at central location 200. The illumination level of optical signal 150 of illumination source 140 is thus selected, as illustrated in FIG. 5, This helps optimize the illumination for each row to get a nominal exposure. The nominal exposure is the amount of light that increases the center pixel of a row to be substantially similar to the pixels in the optical center of the field for a uniform target.

Figure 6:
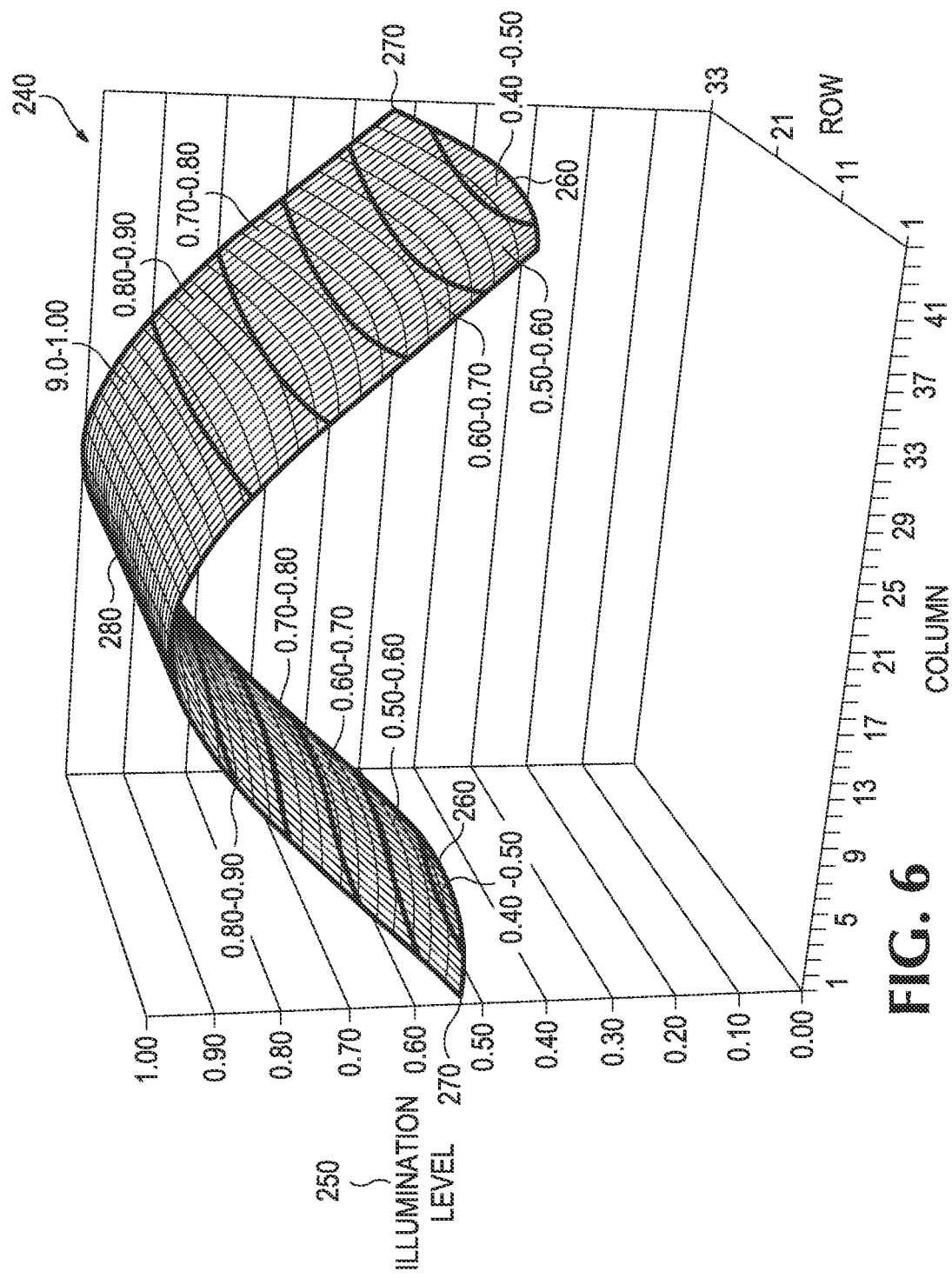
FIG. 6 shows an example of a corrected illumination profile at a multi-dimensional array of light sensitive elements for a rectangular document captured by an 82 degree total field-of-view lens.

If illumination controller 170 causes illumination source 140 to produce an optical signal 150 across rows 180 of array 130 with the illumination level profile shown in FIG. 5, the illumination at multi-dimensional array of light sensitive elements 130 is improved to the level shown in graph 240 of FIG. 6. With this implementation, the illumination level 250 at edges 260 is now the worst case as opposed to the corners 80 in the non-optimized system shown in FIG. 3. For corners 270 of the image represented by graph 240 shown in FIG. 6, the illumination ratio increases from approximately 32% to approximately 53%. This increases the signal-to-noise ratio by approximately 1.6× for corners 270. The worst case illumination is now located at edges 260 in row 17 and is approximately 46% of the central location 280 illumination level 250.

The illumination level 250 remains substantially the same for central location 280 because the level of optical signal 150 is selected to be substantially equal to the non-optimized system illustrated in FIG. 3.

Figure 7:
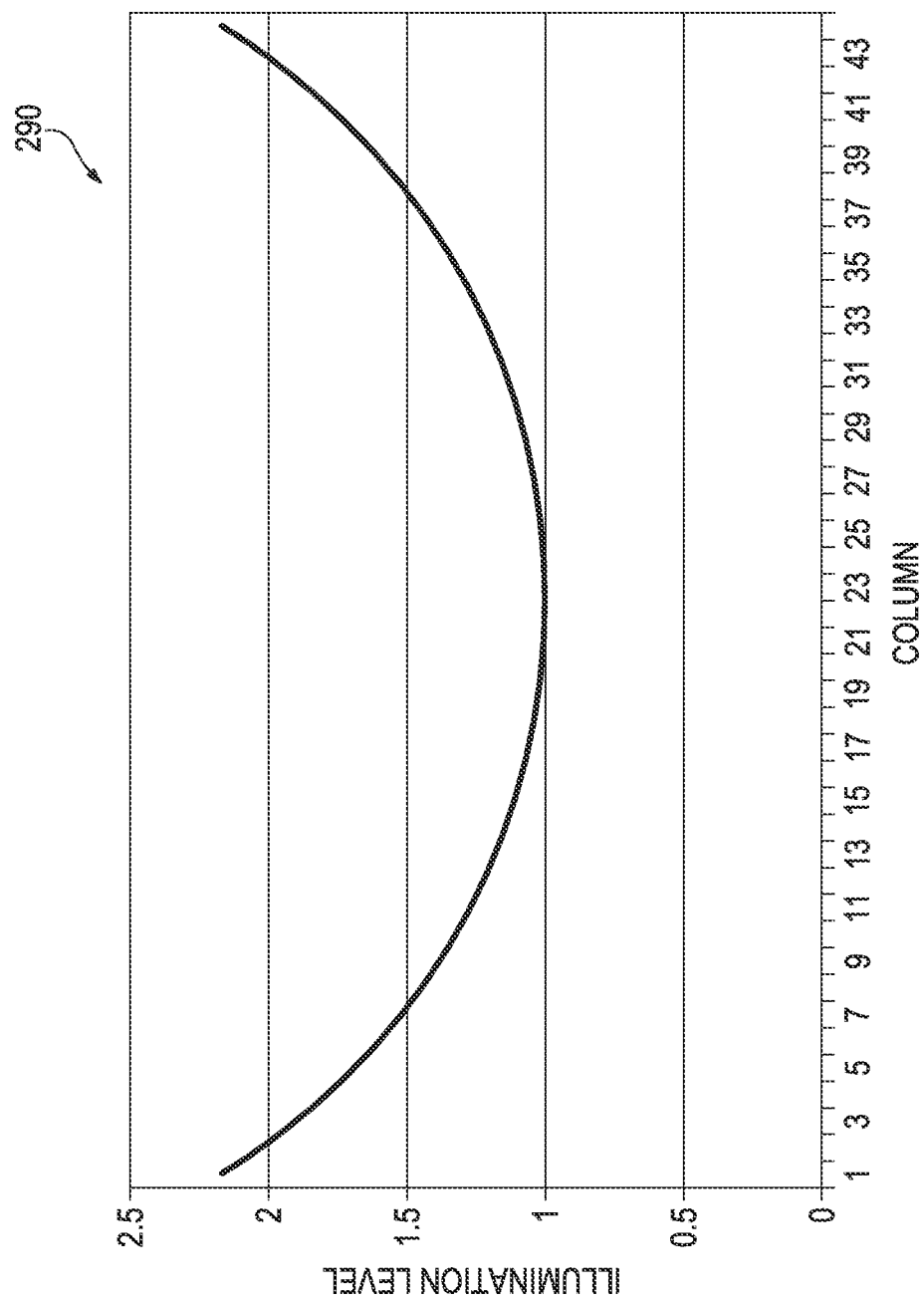
FIG. 7 is another example of an illumination level profile.
Figure 8:
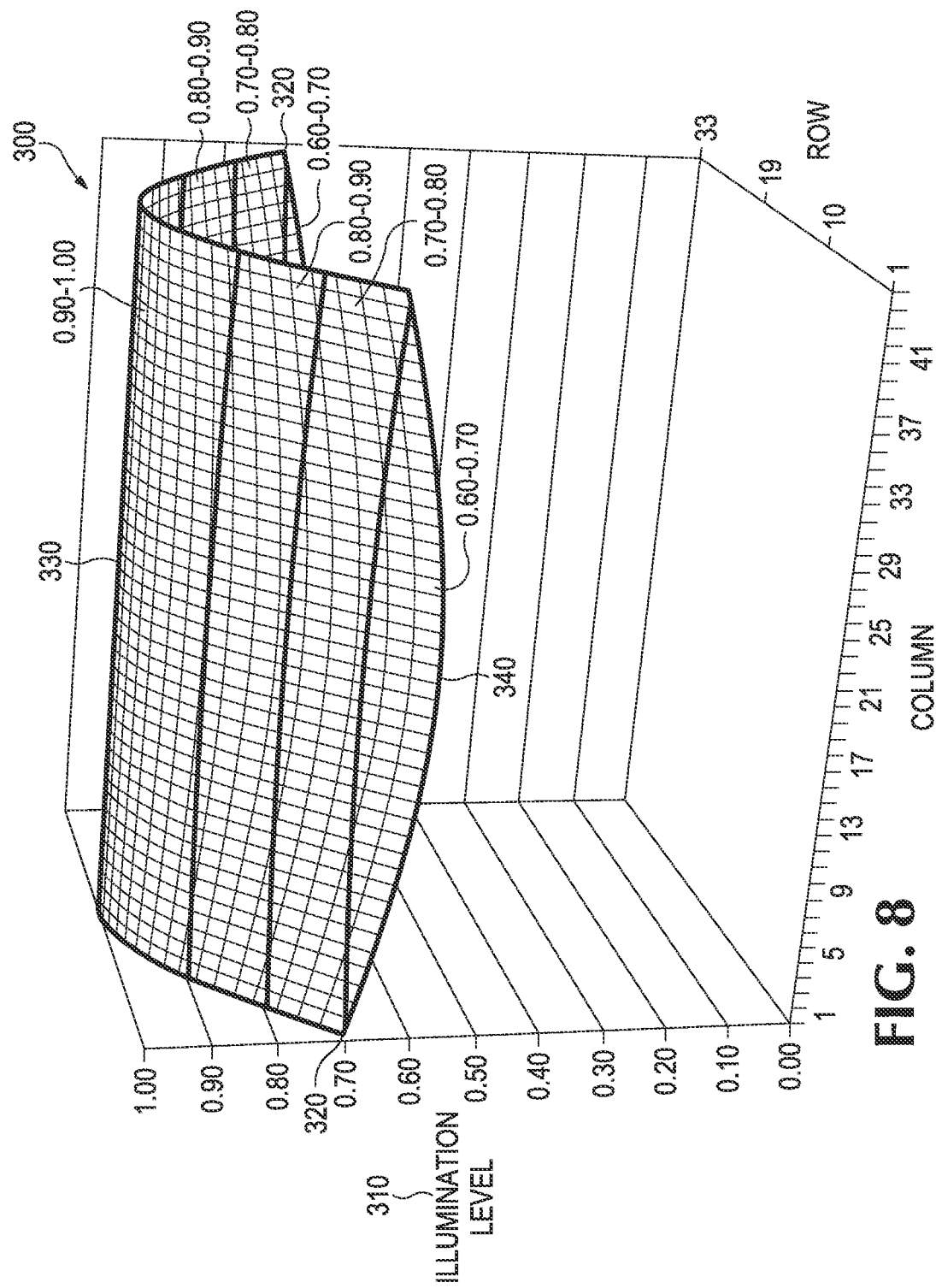
FIG. 8 shows another example of a corrected illumination profile at a multi-dimensional array for a rectangular document captured by an 82 degree total field-of-view lens.

As an alternative example, illumination controller 170 can cause illumination source 140 to proceed, in an orthogonal direction to that illustrated in FIGS. 5 and 6, to produce an optical signal 150 across the forty-four (44) columns 190 of array 130. In this implementation, the rolling shutter is designed to move through the columns 190 of array 130. This approach improves the illumination level to an even greater extent than that illustrated in FIGS. 5 and 6. FIG. 7 shows an illumination level profile 290 utilizing this approach for each of the forty-four (44) columns 190 of array 130. FIG. 8 shows a graph 300 of the illumination level at multi-dimensional array of light sensitive elements 130 that results from the utilization of the illumination profile illustrated in FIG. 7 for the forty-four (44) columns 190 of array 130.

As can be seen in FIG. 8, the minimum illumination level 310 for the corners 320 of the image is approximately 70% versus approximately 32% for the non-optimized system shown in FIG. 3. This corresponds to an approximate 2.16× increase in signal-to-noise ratio of the corners 320. The illumination level remains substantially the same for the central location 330 because the level of optical signal 150 is selected to be substantially equal to the non-optimized system shown in FIG. 3. However, the minimum illumination level 310 is approximately 61% for edges 340 of graph 300 for this optimized system versus approximately 32% for corners 80 of the non-optimized system illustrated in FIG. 3. This means the worst case signal-to-noise ratio is improved by approximately 90% for this implementation.

The illumination level profile can be different from those used in the examples provided above and discussed with respect to FIGS. 5-8. The particular illumination level profile is selected to optimize the illumination level at multi-dimensional array of light sensitive elements 130 based on the particular characteristics of an imaging device (e.g., the field-of-view, geometry of the multi-dimensional array of light sensitive elements 130, etc.). These illumination profiles can be determined in a variety ways and derived computationally as needed or stored in a look-up table on computer-readable medium 220.

Figure 9:
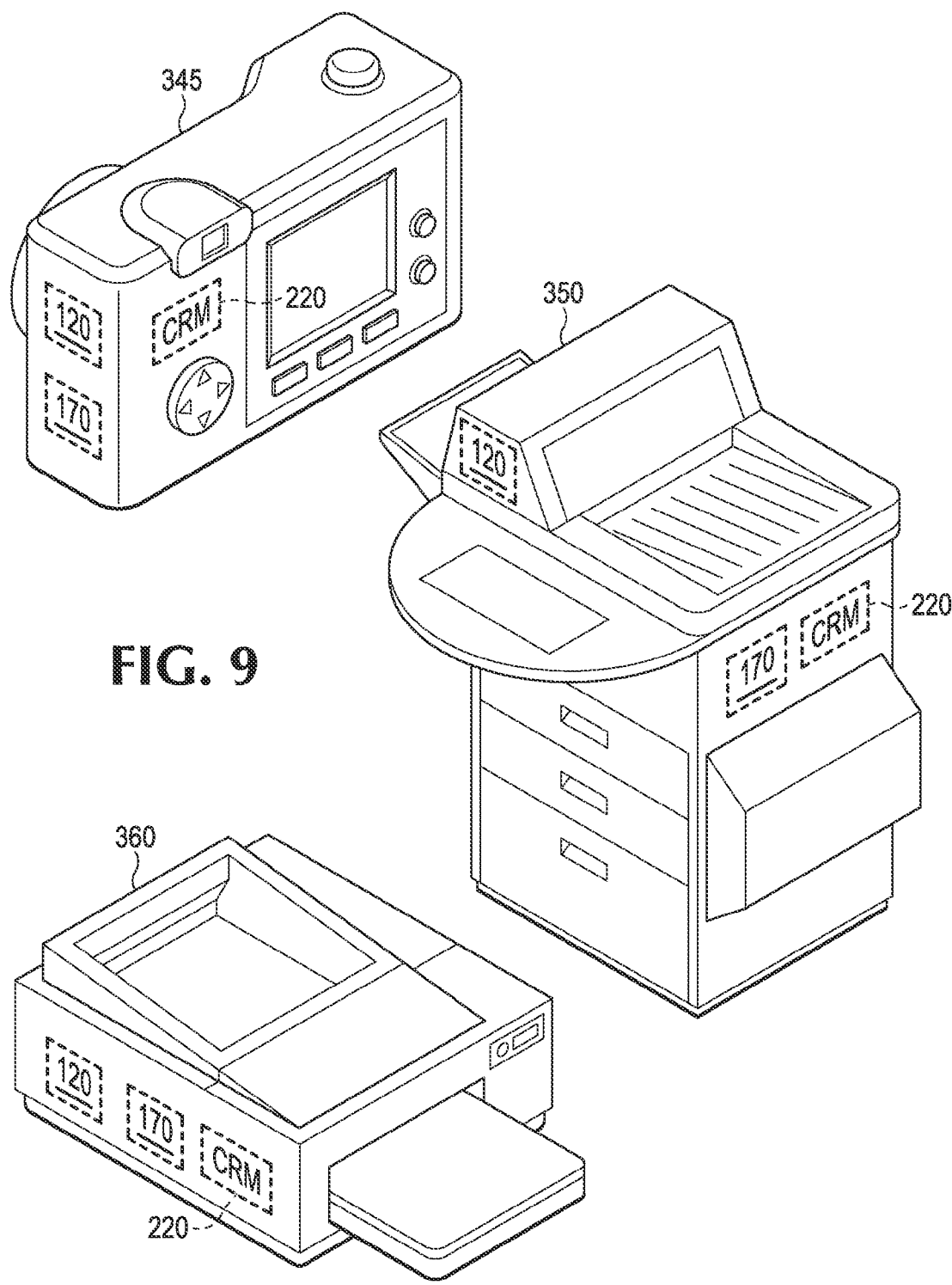
FIG. 9 illustrates examples of some of the devices in which the imaging device of FIG. 4 may be used.

As shown in FIG. 9, there are several applications for the imaging device 120 illustrated in FIG. 4. For example, it can be used in a camera 345, printing device 350 and a scanner 360. Although not illustrated, it is to be understood that other applications are also possible.

Figures 10, 11:
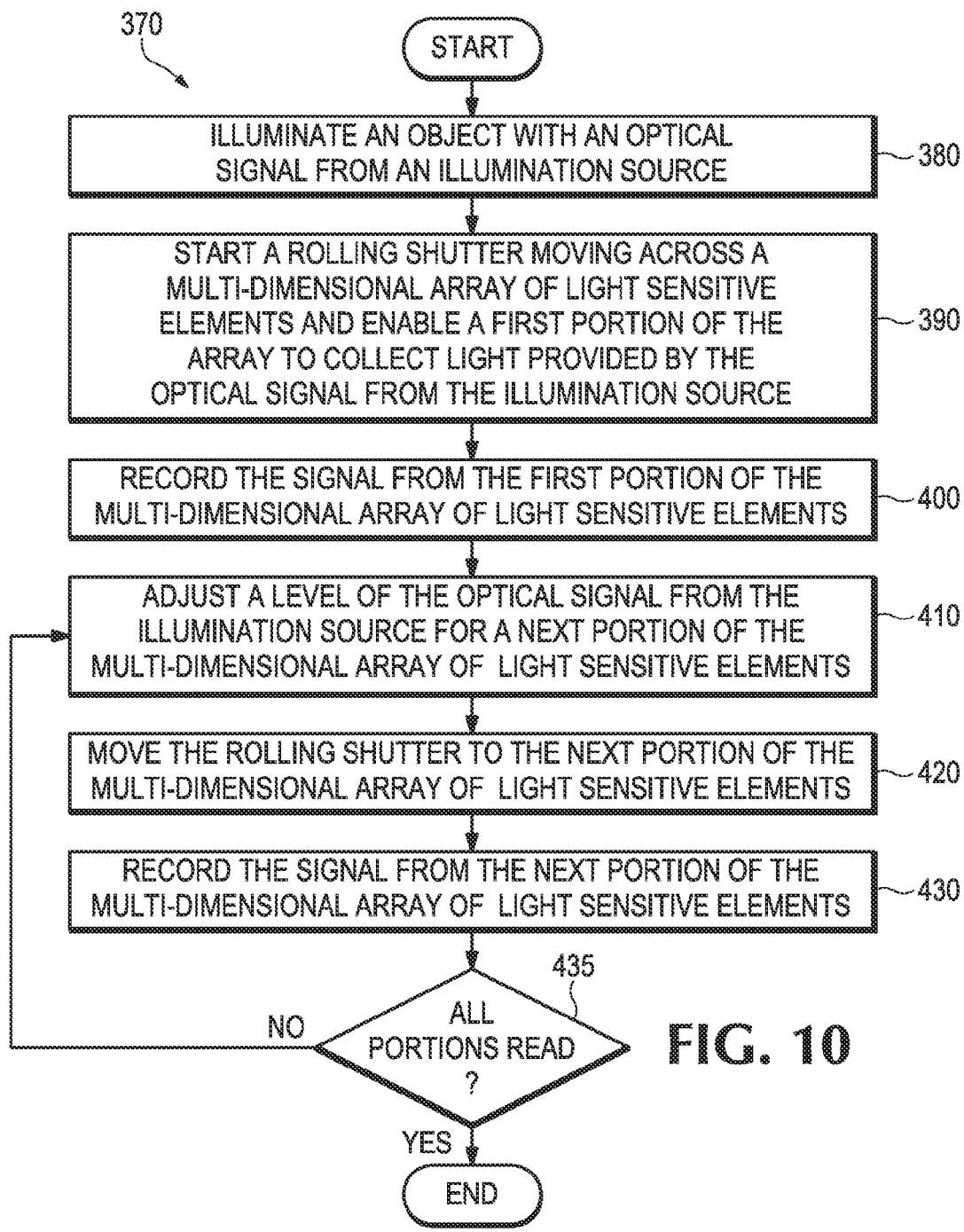
FIG. 10 is a block diagram and example of a method for use in an imaging device.
FIG. 11 is a block diagram and example of additional elements of the method shown in FIG. 10.

An example of a method 370 for use in an imaging device 120 is illustrated in FIG. 10. Method 370 begins by illuminating an object with an optical signal from an illumination source, as shown by block 380. Next, method 370 proceeds by starting a rolling shutter moving across a multi-dimensional array of light sensitive elements and enabling a first portion of the array to collect light provided by the optical signal from the illumination source, as shown by block 390 in FIG. 10. Next, method 370 records the signal from this first portion of the array, as shown in block 400 in FIG. 10. Method 370 adjusts a level of the optical signal from the illumination source so that the level is appropriate for a next portion of the array, as shown by block 410 of FIG. 10. The level of the optical signal at the first portion of the multi-dimensional array of light sensitive elements may be increased relative to the level of the optical signal at the second portion of the multi-dimensional array of light sensitive elements.

Next, method 370 moves the rolling shutter to a next portion of the multi-dimensional array of light sensitive elements, as generally indicated by block 420 in FIG. 10. Next, method 370 records the signal for the next portion of the array, as shown by block 430 in FIG. 10. Method 370 then determines if all portions of the array have been read, as generally indicated by block 435 in FIG. 10. If all portions have been read, method 370 ends. If not, then method 370 returns back to block 410 and continues, as indicated in FIG. 10.

Method 370 may also construct an image from the signals recorded from all the portions of the array, as shown by block 440 in FIG. 11. Finally, method 370 may conclude by printing the constructed image, as indicated by block 450 of FIG. 11.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. For example, the rolling reset and/or the rolling readout operation can be performed at a varying speed, rather than a uniform one. As an additional example, the illumination source 140 may include other optical signal sources such as one or more bulbs, rather one or more LEDs 145. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. An imaging device, comprising:
   a multi-dimensional array of light sensitive elements that includes a central location;
   an illumination source that outputs an optical signal;
   an optical element that focuses the optical signal of the illumination source on the multi-dimensional array of light sensitive elements; and
   an illumination controller that varies an output of the optical signal of the illumination source to control an exposure at a location of the multi-dimensional array based upon distance from the central location.

2. The imaging device of claim 1, wherein the multi-dimensional array of light sensitive elements includes a plurality of rows and the illumination controller varies the output of the optical signal based upon a location of the row in the multi-dimensional array.

3. The imaging device of claim 1, wherein the multi-dimensional array of light sensitive elements includes a plurality of columns and the illumination controller varies the output of the optical signal based upon a location of the column in the multi-dimensional array.

4. The imaging device of claim 1, further comprising a reset operation that proceeds through the multi-dimensional array of light sensitive elements and a readout operation that proceeds through the multi-dimensional array of light sensitive elements.

5. The imaging device of claim 4, wherein one of the reset operation and the readout operation is performed at a varying speed.

6. The imaging device of claim 1, further comprising a non-transitory computer-readable storage medium including a look-up table of values representative of an illumination profile, and wherein the illumination controller varies the output of the optical signal of the illumination source based on the look-up table of values.

7. The imaging device of claim 1, wherein the illumination controller increases the output of the optical signal as a distance from the central location increases.

8. The imaging device of claim 1, wherein the multi-dimensional array of light sensitive elements includes an inner portion and an outer portion and the illumination controller increases the output of the illumination source for the outer portion relative to the output of the illumination source for the inner portion.

9. The imaging device of claim 1, further comprising one of a printing device, camera, and scanner.

10. A non-transitory computer-readable storage medium storing instructions that, when executed by a processor, cause the processor to:
    illuminate a first portion of a multi-dimensional array of light sensitive elements with an optical signal from an illumination source;
    illuminate a second portion of the multi-dimensional array of light sensitive elements with the optical signal from the illumination source; and
    control a level the optical signal from the light source so that the level is different at the first portion of the multi-dimensional array of light sensitive elements than the level at the second portion of the multi-dimensional array of light sensitive elements.

11. The non-transitory computer-readable medium of claim 10, wherein the level of the optical signal at the first portion of the multi-dimensional array of light sensitive elements and the level of the optical signal at the second portion of the multi-dimensional array of light sensitive elements are each selected to compensate for light falloff within the optical field.

12. The non-transitory computer-readable medium of claim 10, wherein the level of the optical signal is increased during illumination of an edge of the optical field and the level of the optical signal is decreased during illumination of a center of the optical field.

13. The non-transitory computer-readable medium of claim 10, further comprising stored instructions that, when executed by a processor, cause the processor to record the light collected by a first set of light sensitive elements located adjacent the first portion of the multi-dimensional array of light sensitive elements.

14. The non-transitory computer-readable medium of claim 13, further comprising stored instructions that, when executed by a processor, cause the processor to construct an image from the light collected by the first set of light sensitive elements located adjacent the first portion of the multi-dimensional array of light sensitive elements.

15. The non-transitory computer-readable medium of claim 14, further comprising stored instructions that, when executed by the processor to print an image constructed from the light collected by the multi-dimensional array of light sensitive elements.

16. A method for use in an image recording apparatus, comprising:
    illuminating a first portion of a multi-dimensional array of light sensitive elements with an optical signal from an illumination source;
    illuminating a second portion of the multi-dimensional array of light sensitive elements with the optical signal from the illumination source; and
    adjusting a level of the optical signal from the illumination source so that the level is different at the first portion of the multi-dimensional array of light sensitive elements than the level of the optical signal at the second portion of the multi-dimensional array of light sensitive elements.

17. The method of claim 16, further comprising increasing the level of the optical signal at the first portion of the multi-dimensional array of light sensitive elements relative to the level of the optical signal at the second portion of the multi-dimensional array of light sensitive elements.

18. The method of claim 16, further comprising recording light collected by a first set of light sensitive elements located adjacent the first portion of the multi-dimensional array of light sensitive elements.

19. The method of claim 18, further comprising constructing an image from the light collected by the first set of light sensitive elements located adjacent the first portion of the multi-dimensional array of light sensitive elements.

20. The method of claim 19, further comprising printing an image constructed from the light collected by the multi-dimensional array of light sensitive elements.

* * * * *

UNITED STATES PATENT AND TRADEMARK OFFICE
CERTIFICATE OF CORRECTION

PATENT NO. : 8,530,815 B2
APPLICATION NO. : 13/149646
DATED : September 10, 2013
INVENTOR(S) : Kurt Eugene Spears Page 1 of 1

It is certified that error appears in the above-identified patent and that said Letters Patent is hereby corrected as shown below:

In the Claims:

In column 6, line 22, in Claim 10, delete "level" and insert -- level of --, therefor.

Signed and Sealed this
Twelfth Day of November, 2013

Teresa Stanek Rea
*Deputy Director of the United States Patent and Trademark Office*